Jan. 4, 1938.　　　M. C. SCHULTZ　　　2,104,278

BREAD SLICER GUIDE

Filed Sept. 12, 1936

INVENTOR
Michael C. Schultz,
BY
Wheeler, Wheeler & Wheeler
ATTORNEYS

Patented Jan. 4, 1938

2,104,278

UNITED STATES PATENT OFFICE 2,104,278

BREAD SLICER GUIDE

Michael C. Schultz, Green Bay, Wis.

Application September 12, 1936, Serial No. 100,455

1 Claim. (Cl. 146—150)

This invention relates to improvements in bread slicer guides.

The object of my invention is to provide a bread slicer guide capable of receiving any size or shape of loaf of bread, to securely hold the loaf while bread is being sliced therefrom, and at the same time to provide a thickness gauge to assist in the cutting of a slice of bread which is even and regular and of uniform predetermined thickness.

In the drawing.

Like parts are identified by the same reference characters throughout the several views.

Figure 1:
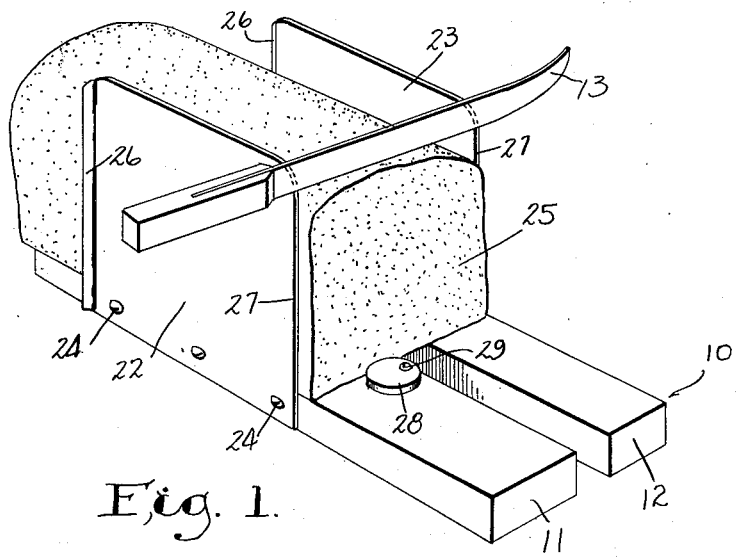
Figure 1 is a perspective view of my bread slicer guide showing a loaf of bread in position in the guide, with a knife in position to commence a slicing operation.

My bread slicer guide is to be used in homes and in places where different sizes and shapes of bread in loaves must be sliced, and I have therefore provided a bread slicer guide which is universally usable despite shapes and varieties of loaves of bread. In accomplishing this I have provided a base plate 10 which is divided and universally adjustable resiliently. My base plate is composed of two pieces 11 and 12 of wood or other suitable material against which a knife 13 may be operated without damage to the sharpened edge of the knife.

The pieces 11 and 12 of the base plate are bored at 14 and 15 for the reception of tension springs 16 and 17 which are anchored upon screws 18 in recesses 19 in the side margins of the boards. Within the spiral springs I provide guide rods 20 and 21 respectively, whereby to keep the boards 11 and 12 in parallel alignment.

At either side of the bed plate 10 I provide loaf contacting uprights 22 and 23, between which the loaf of bread 25 is received with a resilient compression. These uprights may be secured to the pieces 11 and 12 by any suitable means such as screws 24.

Because of the comparatively great width of the bed plate when the pieces 11 and 12 are close together, and the fact that the tension springs 16 and 17 extend substantially across the entire guide, I am able to provide a modified pressure upon a loaf of bread placed between the uprights which is not sufficient to unduly compress even the freshest loaf.

To assist the user in placing a loaf between the uprights, I flare the margins 26 to comprise a somewhat funnel-shaped entry at one end of my device. The margins 27 at the other ends of the guides are preferably vertical or at right angles to the surface of the pieces 11—12. These margins 27 comprise the actual guide for the knife blade 13, and I have found it advisable to use sheet metal or other similar material for the uprights 22—23 so that in the ordinary use of the knife 13 the margins 27 may abrade the edge of the knife and assist in maintaining the peculiarly rough sharpened edge which is so acceptable in the cutting of fresh bread.

Figure 2:
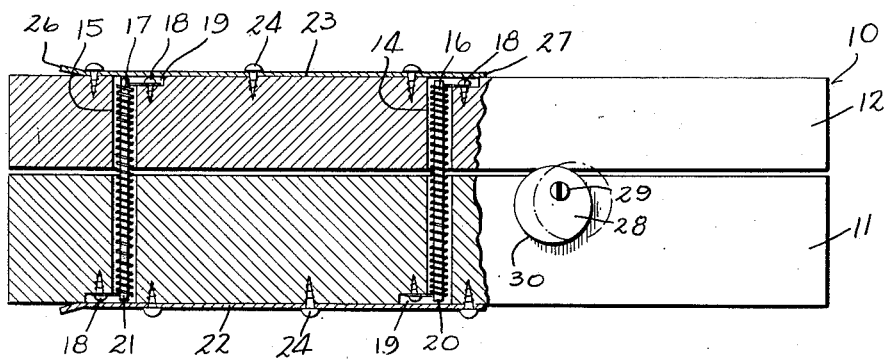
Figure 2 is a plan view of my guide with a portion of the device cut away to exhibit a horizontal section.

It will be noted that the piece 11 is of different width than piece 12. I have purposely made the pieces of unequal width so that a stop 28 may be rotatably positioned by means of a screw 29 offset from the center of the stop 28, whereby to provide an eccentric movement of the margins 30 thereof, thus providing a simple centrally positioned stop for determining the thickness of the slice to be cut in my slicer guide. If the stop 28 is rotated to the position shown in dotted lines in Fig. 2, a thicker slice is determined. If it is placed in the position shown in full lines in Fig. 2, a moderate thickness of slice will be secured.

I claim:

In a device of the character described, parallel bed plate members provided with transverse bores, spiral tension springs extending through said bores and secured to said bed plate members adjacent their outer margins, a guide rod fitted in one of the spiral springs whereby to maintain the bed plate members in parallel relationship, loaf engaging uprights secured to said bed plate members and provided with knife guiding surfaces, said bed plate members being separable in parallelism to provide space between said uprights for the reception of a loaf to be sliced.

MICHAEL C. SCHULTZ.